United States Patent [19]
Taylor et al.

[11] Patent Number: 6,035,758
[45] Date of Patent: *Mar. 14, 2000

[54] SAW BLADE DRIVE SYSTEM

[76] Inventors: Gary R. Taylor, 27 Midvalley Crescent, SE., Calgary, Alberta, Canada, T2X 1B1; Paul Wierzba, 470 Silvergrove Dr. NW., Calgary, Alberta, Canada, T3B 4Y5

[*] Notice: This patent issued on a continued prosecution application filed under 37 CFR 1.53(d), and is subject to the twenty year patent term provisions of 35 U.S.C. 154(a)(2).

[21] Appl. No.: 08/480,288

[22] Filed: Jun. 7, 1995

[51] Int. Cl.$^7$ ........................................ B26D 1/12
[52] U.S. Cl. .................... 83/665; 83/698.41; 403/359
[58] Field of Search .................... 403/359, 358; 83/666, 665, 835, 676, 698.41

[56] References Cited

U.S. PATENT DOCUMENTS

| | | | |
|---|---|---|---|
| 1,251,844 | 1/1918 | Trout | 83/665 |
| 3,415,153 | 12/1968 | Steiner | 403/359 |
| 3,440,915 | 4/1969 | Weyant | 83/666 |
| 3,619,882 | 11/1971 | Sobanski et al. | 403/359 |
| 3,703,915 | 11/1972 | Pearson | 83/676 |
| 4,006,671 | 2/1977 | Ochs | 83/665 |
| 4,572,291 | 2/1986 | Robison | 403/359 |
| 4,657,428 | 4/1987 | Wiley | 403/359 |
| 4,730,952 | 3/1988 | Wiley | 83/665 X |
| 4,798,268 | 1/1989 | Fargier et al. | 403/359 |
| 4,826,090 | 5/1989 | Orphall | 83/698.41 X |
| 4,977,793 | 12/1990 | Husted | 403/359 |
| 5,165,881 | 11/1992 | Wicen | 403/359 |
| 5,522,441 | 6/1996 | Anselm et al. | 83/665 X |
| 5,702,415 | 12/1997 | Matthai et al. | 83/676 X |

FOREIGN PATENT DOCUMENTS

| | | | |
|---|---|---|---|
| 1015246 | 8/1977 | Canada . | |
| 515574 | 2/1955 | Italy | 83/678 |
| 405038621 | 2/1993 | Japan | 83/835 |

Primary Examiner—Douglas D. Watts
Assistant Examiner—Charles Goodman
Attorney, Agent, or Firm—Burns, Doane, Swecker, Mathis, L.L.P.

[57] ABSTRACT

A sawblade and a drive spline having a drive configuration therebetween. The drive configuration comprises inner driven surfaces on the sawblade which are driven by the drive spline which has outer drive recesses complementary to the inner driven surfaces of the sawblade. First and second radials extend outwardly from the axis of rotation of the drive spline and sawblade. They extend so as to contact the ends of a respective recess or drive surface most closely located to the axis of rotation. Second and third radials extend to contact the ends of the most remotely located recess or drive surface. The angular distance between the first and second radials is greater than the angular distance between the third and fourth radials.

12 Claims, 4 Drawing Sheets

SAW BLADE DRIVE SYSTEM

INTRODUCTION

This invention relates to a saw blade and a drive system therefore and, more particularly, to a sawblade and its associated drive spline having a specific driving configuration.

BACKGROUND OF THE INVENTION

Circular type sawblades to cut cants or lumber are, of course, known together with their associated drive splines. Typically, the drive spline has a series of rounded or convex male drive pieces spaced intermittently and circumferentially around the drive spline. They mate with corresponding concave female recesses in the saw blade. Typically, the sawblade is mounted onto the drive spline endwise. It slides over the spline until the desired operating position on the drive spline is reached. Under operating conditions, the sawblade is maintained in its desired position with sawguides which prevent undesirable movement in the sawblade. This keeps the kerf or cutting width created by the blade narrow which is desirable in order not to avoid wood wastage during the sawing operation.

The drive spline used with the aforementioned convex male driving pieces has problems. Such problems relate to safety, tolerances and sawblade driving efficiency.

In respect of the former, there has arisen the unfortunate practise of "tree spiking" by those protective of logs which they feel should not be felled. This practise involves driving large nails or spikes into the trunks of trees before cutting. Often the spikes are not readily observed by either the fellers or the sawmill operators with the result that during sawmill operations, the sawblade may strike a spike within the cant or log during the cutting operation. This is a most dangerous occurrence since the sawblade can tear or fragment and pieces of shrapnel are distributed at high energy levels throughout the area where the cutting is taking place. This disintegration takes place because there is no retention of the sawblade by the spline when the sawblade splits or tears after contact with the spike. Sawmill operators lives have been lost and their injuries have been severe because of these tree spiking practises. It would be advantageous if the sawblade did not tear away from the drive spline under such conditions.

Yet a further disadvantage with present sawblades and the convex type drive splines relates to operating tolerances. Because of the convex type drive spline which mates with corresponding type recesses in the sawblade, a series of point contacts occurs when the two curved surfaces meet. This point contact results in a series of high stress points between the drive spline and the sawblade which increases wear on both members and reduces the driving efficiency between the spline and the sawblade.

Yet a further disadvantage with the present sawblade-drive spline system is that the position of the sawblade on the drive spline can change during operation. This is so because there are tolerances between the convex drive surfaces of the drive spline and the concave driven surfaces of the sawblade. The saw blade will move upwardly and downwardly on the spline during operation while various impact loadings occur and the sawblade moves upwardly and downwardly on the spline through these tolerances. Thus, the actual driving efficiency is adversely affected.

Yet a further disadvantage with the present drive spline design is the fact that the spline has to be hardened to a hardness greater than that of the blade. This practise is time consuming and expensive.

SUMMARY OF THE INVENTION

According to one aspect of the invention, there is provided a sawblade of circular configuration having an axis of rotation, an outer cutting edge and a plurality of inner driven surfaces defined by a first angular distance between a first and second radial, said first and second radials contacting each end of a respective one of said driven surfaces located most closely to said axis of rotation, and a second angular distance between a third and fourth radial, said third and fourth radials contacting each end of said respective one of said driven surfaces located most remotely from said axis of rotation, the angular distance between said first and second radials being greater than the angular distance between said third and fourth radials.

According to a further aspect of the invention, there is provided a drive spline of circular configuration having an axis of rotation, a plurality of outer drive recesses defined by a first angular distance between a first and second radial, said first and second radials contacting each end of a respective one of said drive recesses located most closely to said axis of rotation and a second angular distance between a third and fourth radial, said third and fourth radials contacting each end of a respective one of said drive recesses located most remotely from said axis of rotation, the angular distance between said first and second radials being greater than the angular distance between said third and fourth radials.

According to a further aspect of the invention, there is provided a drive spline of circular configuration having an axis of rotation, said drive spline having a plurality of drive recesses having replaceable drive surfaces along first angular distance between a first and second radial, said drive surfaces extending axially along said drive spline.

BRIEF DESCRIPTION OF THE SEVERAL VIEWS OF THE DRAWINGS

A specific embodiment of the invention will now be described, by way of example only, with the use of drawings in which.

DESCRIPTION OF SPECIFIC EMBODIMENT

Figure 1:
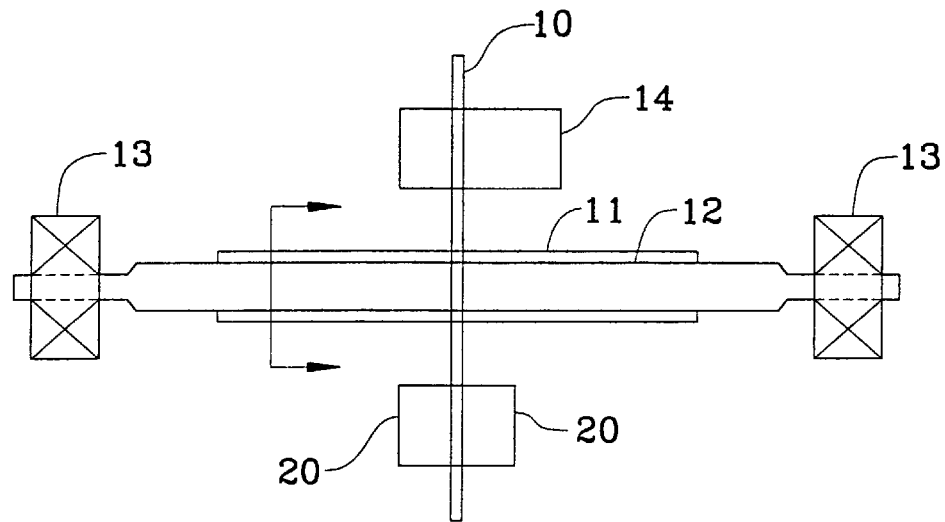
FIG. 1 is a side diagrammatic view of a circular sawblade mounted on a drive spline which, in turn, is mounted on an arbor, the sawblade and drive spline having a configuration according to the invention.

Referring now to the drawings and, more particularly, to FIG. 1, a circular sawblade 10 is mounted on a drive spline 11 which, in turn, is mounted on an arbor 12. Arbor 12 is journalled in bearings 13 and a source of turning power for the arbor 12 is provided (not shown) which is then transferred to the sawblade 10 to turn the sawblade 10 and cut the wood diagrammatically illustrated at 14. A pair of sawguides 20 are mounted on either side of the circular sawblade 10. They guide the sawblade 10 and can move it axially on the drive spline 11. It will be appreciated, of course, that a plurality of sawblades could be mounted on the drive spline 11 depending on the lumber which is being cut and the desires of the operator.

Figure 2:
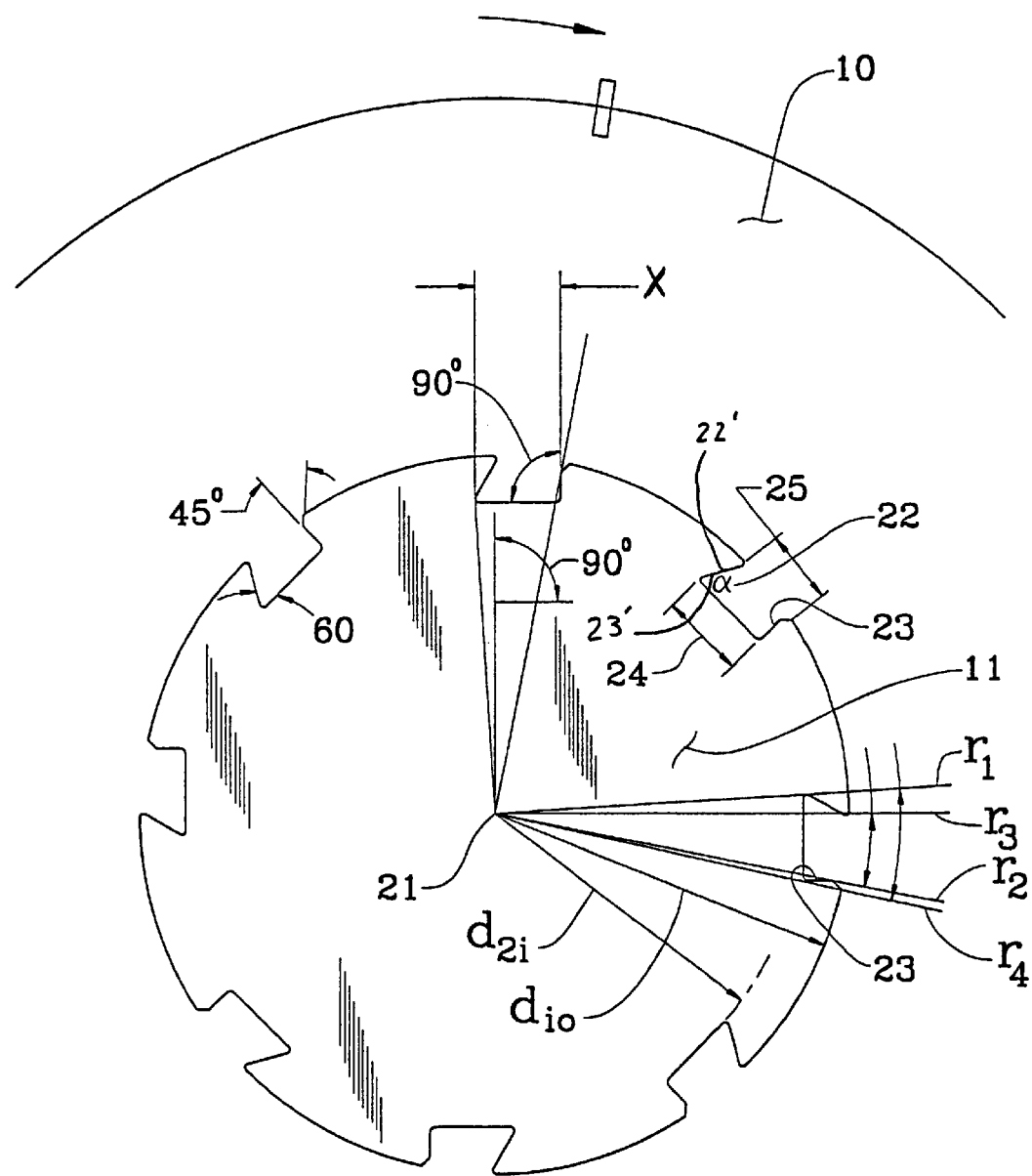
FIG. 2 is a side diagrammatic enlarged view of a circular sawblade mounted on a drive spline and illustrating the drive configuration between the spline and the sawblade according to a first embodiment of the invention.

Reference is now made to FIG. 2 which illustrates the sawblade 10 mounted on the drive spline 11. The drive spline 11 and sawblade 10 have a common axis of rotation 21 and, under operation, the sawblade 10 rotates clockwise as seen by the arrows. A series of projecting inner driven elements 22 of sawblade 10 are complementary to outer drive recesses 23 of drive spline 11. Each inner driven element 22 of the sawblade possesses an inner driven surface 22' (i.e., the surface of the driven element 22 located on the upstream side of the driven element with respect to the direction of rotation). Each of the drive recesses 23 of the drive spline also includes an outer drive surface 23' that faces the respective inner driven surface 22' of the sawblade. The inner distance 24 of driven elements 22 is greater that the outer distance 25 such that if the sawblade contacts a foreign object such a spike in a tree being cut, the blade 10 will not be hurled from the drive spline 11 but will be retained by the drive spline 11 such that the operator may immediately terminate operation of the drive system.

More particularly, the outside circumference of the drive spline is indicated by first diameter $d_{io}$ and the inside diameter of the drive spline is indicated by second diameter $d_{2i}$. The distance between $d_{io}$ and $d_{2i}$ is the distance between the outer diameter of the drive spline 11 and the most inwardly distance of the drive recess 23.

Figure 3:
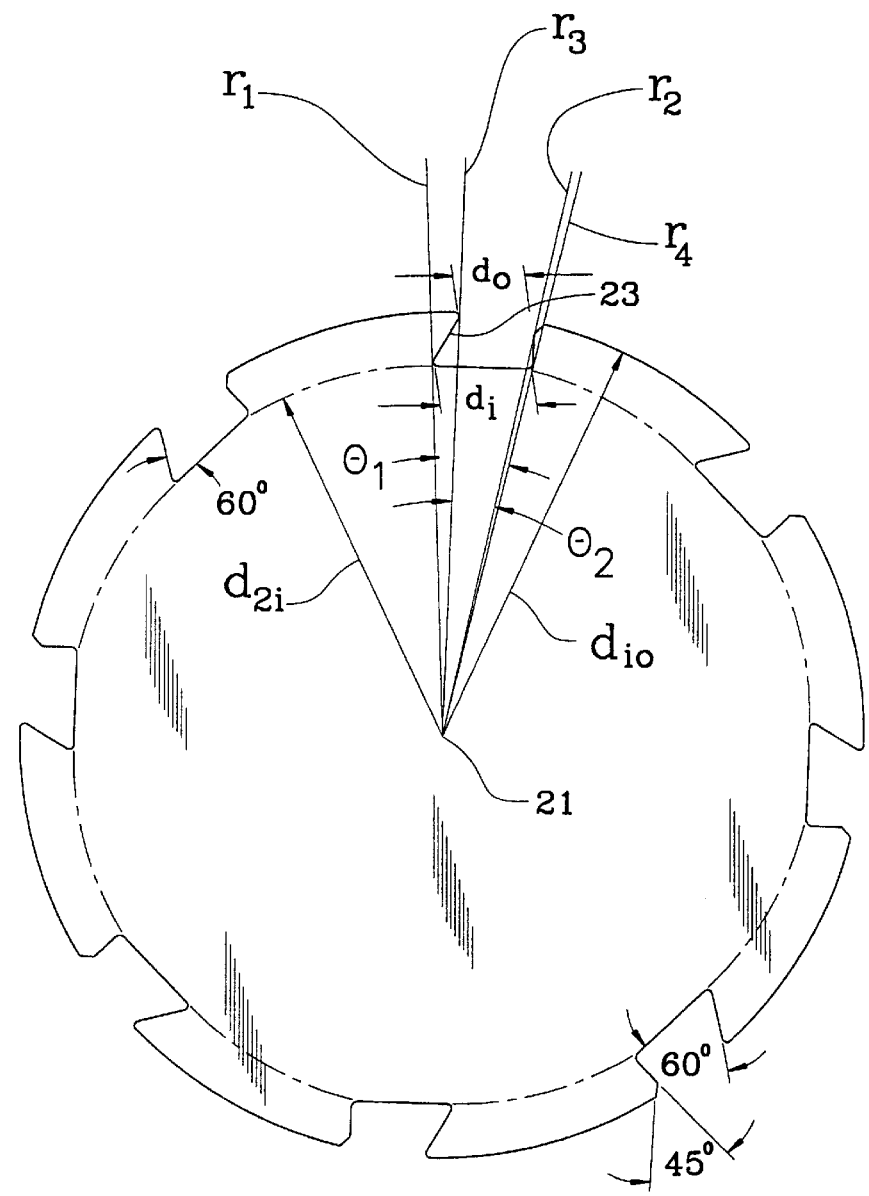
FIG. 3 is an enlarged view of the circular sawblade of FIG. 2.

First and second radials $r_1$, $r_2$ are drawn from the axis of rotation 21 to touch the ends of the drive recess 23 located most closely to axis 21. Third and fourth radials $r_3$, $r_4$ are drawn from the axis of rotation 21 to touch the ends of the drive recess 23 located most remotely from axis 21. The angular distance between $r_1$ and $r_2$ will be larger than the distance between $r_3$ and $r_4$ as can clearly be seen from FIGS. 2 and 3.

For example, in a first embodiment of the invention as illustrated in FIG. 2, the distance x between the ends of the drive recess 23 located closest to axis 21 is 0.597 in. as illustrated. This distance is obtained by drawing radials to each of the ends of the drive recess 23 and measuring the distance of 0.597. A 60 degree angle is cut into the drive spline 23 and a surface is formed 90 degrees to the line defining the distance of 0.597 in. which meets the 60 degree angle cut. This surface defines the most advanced point of the radial $r_1$ and the most retarded point of radial $r_2$.

It will be readily seen that a number of different configurations for the drive recesses 23 of drive spline 11 and the driver elements 22 of sawblade 10 could be used in order to achieve the benefits of the present invention. Reference is made, for example, to FIGS. 4A, 4B, 4C and 4D.

Figure 4A:
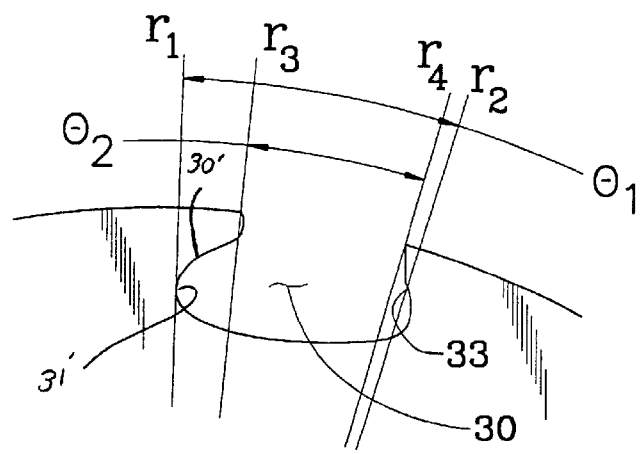
FIGS. 4A, 4B, 4C and 4D are enlarged views of four different drive spline configurations according to a further aspect of the invention.
Figure 4B:
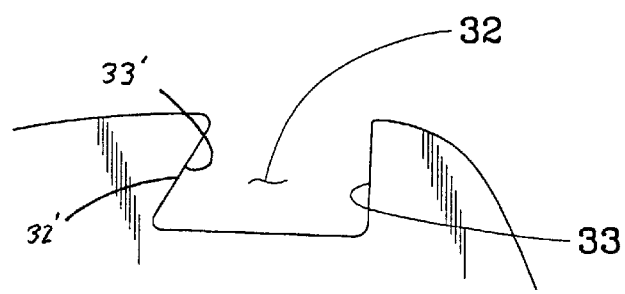

In FIG. 4A, the driven surface 30' of each driven element 30 and the drive surface 31' of each drive recess 31 take a somewhat partially convex configuration. In FIG. 4B, the driven surface 32' of each driven element 32 and the drive surface 33' of each drive recess 33 32 take on an appearance similar to the drive surfaces 22 of FIGS. 2 and 3 but extend inwardly a much greater distance. However, it remains the case that the angular distance $\theta_1$ between the radials $r_1$, $r_2$ is greater than the angular distance $\theta_2$ between the radials $r_3$, $r_4$.

Figure 4C:
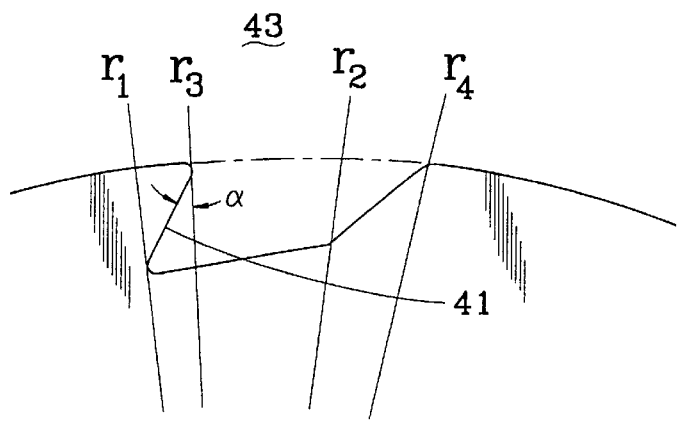
Figure 4D:
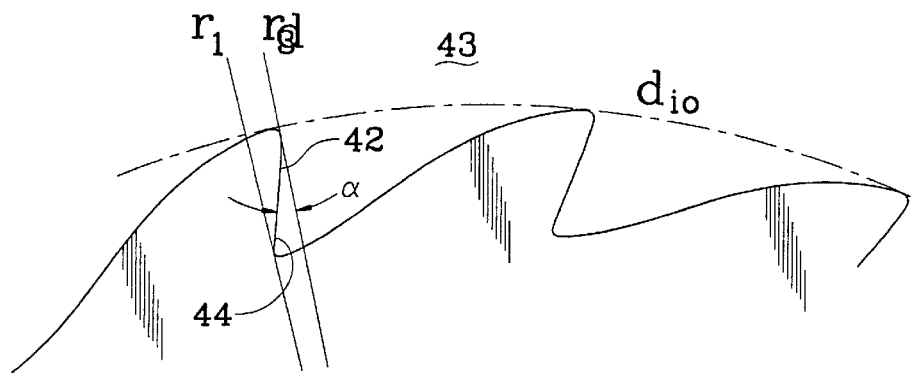

FIGS. 4C and 4D illustrate two further drive configurations according to further aspects of the invention. In each of these configurations, there is a drive surface 41, 42 which has an angle a relative to radial $r_3$ which is greater than zero degrees. Thus, there will be a partial retaining effect executed on the sawblade 43 by the forces executed between drive surfaces 41, 42 of the spline by the sawblade.

Figure 5:
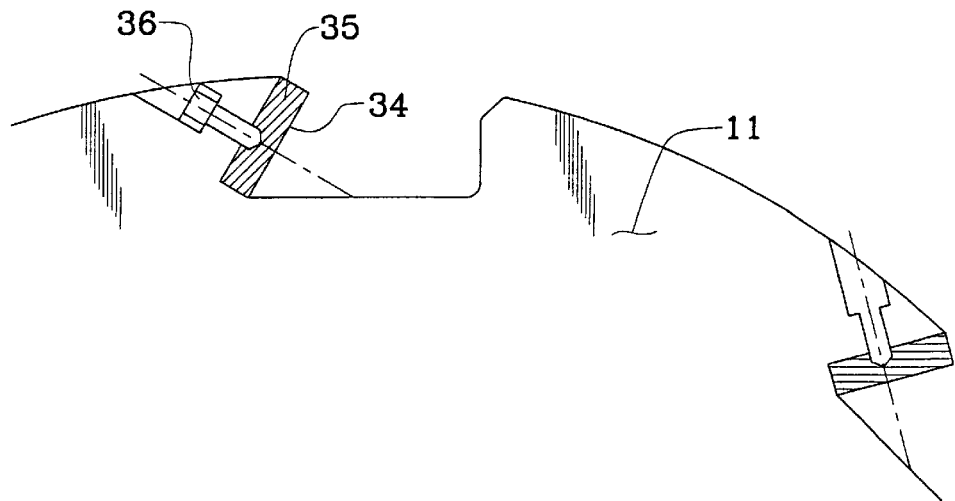
FIG. 5 is an enlarged view of an insert according to a further aspect of the invention.

In FIG. 5, replaceable drive surfaces 34 are located along removable inserts made of hardened steel material 35 extending axially along the spline 11, and being secured to the drive spline with bolts 36.

While specific embodiments of the invention have been described, such descriptions should be taken as illustrative of the invention only and not as limiting its scope as defined in accordance with the accompanying claims.

What is claimed is:

1. A sawblade of circular configuration for being mounted on an arbor to effect cutting through rotation of the sawblade in a rotational direction about a rotational axis, the sawblade being a one-piece sawblade having an outer cutting edge and a center opening for receiving the arbor, the center opening in the sawblade being bounded by a plurality of inner driven surfaces circumferentially spaced about the central opening for operatively interfacing with drive surfaces on the arbor so that rotation of the arbor results in rotation of the sawblade, each of the plurality of inner driven surfaces extending between a first point and a second point, the second point of each inner driven surface being located radially outwardly of the first point, each of the inner driven surfaces being configured so that a second radial extending through the second point is positioned forwardly with respect to the rotational direction of a first radial extending through the first point.

2. The combination of a sawblade and a drive spline of an arbor for rotatably driving the sawblade in a rotational direction about a rotational axis to effect cutting by the sawblade, the sawblade being a one-piece sawblade and including driven surfaces, the drive spline having an outer peripheral surface provided with a plurality of drive surfaces engageable with the driven surfaces on the sawblade to impart rotational movement to the sawblade during rotation of the arbor, each of the plurality of drive surfaces extending between a first point and a second point, the second point of each drive surface being located radially outwardly of the first point, each of the drive surfaces being configured so that a second radial extending through the second point is positioned forwardly with respect to the rotational direction of a first radial extending through the first point.

3. The combination as in claim 2, wherein each of said drive surfaces forms a portion of a drive recess provided in the outer peripheral surface of the drive spline.

4. A one-piece circular sawblade having an axis of rotation for rotating in a direction of rotation, an outer cutting edge and a plurality of inner driven surfaces operably driven by a plurality of drive surfaces on an arbor, at least one of said plurality of inner driven surfaces beginning at a point closer to the axis of rotation of said sawblade and ending at a point further from said axis of rotation of said saw blade, and including an angle formed between a first radial contacting said point closer to said axis of rotation and a second radial contacting said point further from said axis of rotation, said second radial being located forward of the first radial with respect to the direction of rotation of said sawblade when in operating condition.

5. A sawblade as in claim 4, wherein each of said inner driven surfaces is defined by a removable insert, each insert engaging a portion of the sawblade.

6. A sawblade as in claim 5, wherein the portion of the sawblade engaging each insert is generally flat.

7. A sawblade as in claim 4, wherein each inner driven surface is a curved surface.

8. The combination of a drive spline and a sawblade of circular configuration mounted on the drive spline, the sawblade being a one-piece sawblade and having a plurality of spaced apart driven surfaces disposed along a periphery of the sawblade, said sawblade having an axis of rotation and an outer generally circular surface, said drive spline having a plurality of drive surfaces operable to contact the driven surfaces of said sawblade to rotate the sawblade in a rotational direction, each of said drive surfaces being defined by at least one surface beginning at a first point closer to the axis of rotation of said sawblade and ending at a second point further from said axis of rotation of said sawblade, and including an angle between a first radial drawn from said axis of rotation and contacting said first point closer to said axis of rotation and a second radial drawn from said axis of rotation and contacting said second point further from said axis of rotation, said second radial being located forwardly of the first radial with respect to the rotational direction of said sawblade when in an operating condition.

9. The combination as in claim 8, wherein each drive surface is defined by a surface of a removable inert.

10. The combination as in claim 9, wherein said insert is held in place by a connecting bolt.

11. The combination as in claim 10, wherein said insert contacts the sawblade along a substantially flat surface.

12. The combination as in claim 8, wherein said drive surface contacts said driven surface along an interface that is curved.

* * * * *